United States Patent [19]

Rutulante

[11] Patent Number: 5,738,548
[45] Date of Patent: Apr. 14, 1998

[54] WALL MOUNTED RECEPTACLE WITH RETRACTABLE EXTENSION CORD

[76] Inventor: Philip M. Rutulante, 3 Dubois Rd., New Paltz, N.Y. 12561

[21] Appl. No.: 716,811

[22] Filed: Sep. 16, 1996

[51] Int. Cl.⁶ .......................... H01R 25/00; H01R 27/02; H01R 31/00; H01R 33/88
[52] U.S. Cl. .................... 439/652; 439/4; 439/501
[58] Field of Search .................... 439/4, 651, 652, 439/654, 501; 191/12.2 R, 12.4

[56] References Cited

U.S. PATENT DOCUMENTS

| | | | |
|---|---|---|---|
| 2,454,024 | 11/1948 | Alemaghides | 439/652 |
| 3,588,389 | 6/1971 | Sato | 191/12.2 R |
| 3,997,225 | 12/1976 | Horwinski | 439/652 |
| 4,282,954 | 8/1981 | Hill | 439/4 |
| 4,897,512 | 1/1990 | Johnston | 191/12.4 |
| 4,934,962 | 6/1990 | Luu et al. | 439/651 |
| 4,940,859 | 7/1990 | Peterson | 191/12.4 |
| 5,518,417 | 5/1996 | Liu | 439/4 |
| 5,584,729 | 12/1996 | Luu | 439/652 |
| 5,593,316 | 1/1997 | Lyons | 439/652 |

FOREIGN PATENT DOCUMENTS 8806353  8/1988  Italy ................................ 439/4

*Primary Examiner*—Neil Abrams
*Assistant Examiner*—Katrina Davis

[57] ABSTRACT

A wall mounted receptacle with retractable extension cord including a housing with a primary mounting plug unit having a pair of prongs fixed to and extending perpendicularly from the housing for inserting within a conventional electrical receptacle. Further provided is a manual spool reel assembly and an associated extension cord wrapped thereabout thus being capable of being distributed and retracted manually. Also included is a spring-biased automatic spool retraction assembly with an unbiased orientation with the extension cord fully wrapped about the spool cylinder and a biased orientation with the extension cord fully extended exterior of the housing.

1 Claim, 3 Drawing Sheets

WALL MOUNTED RECEPTACLE WITH RETRACTABLE EXTENSION CORD

BACKGROUND OF THE INVENTION

1. Field of the Invention

The present invention relates to a wall mounted receptacle with retractable extension cord and more particularly pertains to supplying electricity to a remotely positioned portable appliance with a retractable extension cord.

2. Description of the Prior Art

The use of extension cord assemblies is known in the prior art. More specifically, extension cord assemblies heretofore devised and utilized for the purpose of providing electricity to remote locations are knows to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,685,634 to Schwartz; U.S. Pat. No. 4,520,239 to Schwartz; U.S. Pat. Des. 324,669 to Co; U.S. Pat. No. 5,361,879 to Lin; U.S. Pat. Des. 275,552 to Izumi; and U.S. Pat. No. 4,338,497 to Drew.

In this respect, the wall mounted receptacle with retractable extension cord according to the present invention substantially departs from the conventional concepts and designs of the prior art, and in so doing provides an apparatus primarily developed for the purpose of supplying electricity to a remotely positioned portable appliance with a retractable extension cord.

Therefore, it can be appreciated that there exists a continuing need for a new and improved wall mounted receptacle with retractable extension cord which can be used for supplying electricity to a remotely positioned portable appliance with a retractable extension cord. In this regard, the present invention substantially fulfills this need.

SUMMARY OF THE INVENTION

In view of the foregoing disadvantages inherent in the known types of extension cord assemblies now present in the prior art, the present invention provides an improved wall mounted receptacle with retractable extension cord. As such, the general purpose of the present invention, which will be described subsequently in greater detail, is to provide a new and improved wall mounted receptacle with retractable extension cord which has all the advantages of the prior art and none of the disadvantages.

To attain this, the present invention essentially comprises a housing having a front face with a square configuration and a first surface area and a rear face with a square configuration and a second surface area. For reasons that become apparent later, the second surface area ideally is greater than the first surface area. As best shown in FIG. 5, the housing further includes four side faces extending between side edges of the front face and side edges of the rear face, wherein the side faces define a skewed periphery which, in turn, defines an interior space. The front face has a circular aperture, shown in FIG. 6, centrally formed therein and an annular recess formed thereabout. A support post with a generally cylindrical configuration is perpendicularly coupled to the rear face at the center thereof within the interior space. The support post extends to a point coextensive with the circular aperture of the front face. A bore is axially formed within the support post. Formed about the support post on the rear face of the housing is an annular flange. Lastly, as shown in FIGS. 3 & 5, the periphery has a cut out formed therein. For mounting the housing to a conventional wall electrical receptacle, a primary mounting plug unit is included. In FIG. 4, it is shown that the mounting plug unit includes a pair of prongs fixed to and extending perpendicularly from an outer surface of the rear face of the housing for inserting within a conventional electrical receptacle. The primary mounting plug unit also has a screw adapted to be inserted within the bore of the support post and further screwably coupled within a standard threaded aperture of the receptacle. Further provided is a plurality of sockets formed on each of the side faces of the housing for allowing coupling with standard electrical plugs associated with an electric appliance. Each socket has a pair of conductive slots each electrically connected to a respective prong of the primary mounting plug unit for receiving power therefrom. As best shown in FIG. 6, a manual spool reel assembly is included with a hollow intermediate spool cylinder rotatably coupled about the support post, wherein the spool cylinder resides coaxially with respect to the support post. A first spool retainer with a first diameter is integrally formed on an inboard end of the spool cylinder with an outer periphery thereof nearly abutting an outboard end of the annular flange of the housing. Associated therewith is a second spool retainer with a second diameter twice that of the first spool retainer. The second spool retainer is integrally formed on an outboard end of the spool cylinder such that the second spool retainer resides in the annular recess of the front face of the housing. The second spool retainer further includes a collapsible reel lever pivotally coupled thereto with a first upright orientation for allowing manual rotation of the spool and further a collapsed orientation. For providing electricity to an appliance which is remotely located, an extension cord assembly includes a pair of annular contact rings coupled about the spool cylinder adjacent a respective spool retainer. For providing electrical communication with the contact rings, a pair of contact strips are included with a first contact strip coupled to the outboard end of the annular flange of the housing and further in slidable abutment with the annular contact ring situated adjacent the first spool retainer. Also provided is a second contact strip coupled to the front face of the housing within the interior space thereof and further in slidable abutment with the annular contact ring situated adjacent the second spool retainer. Extending through the cut out of the housing is an extension cord with a first end having a standard receptacle fixed thereto for coupling with an electrical appliance and a second end with a pair of wires each coupled to separate annular contacts. It should be noted that the contact strips are electrically connected to a respective prong of the primary mounting plug unit for receiving power therefrom. To provide automatic reeling of the cord, an automatic spool retraction assembly has a coiled spring situated within a space formed between the support post of the housing and the spool cylinder of the spool reel assembly. A first end of the spring is coupled to the support post and a second end is coupled to the intermediate spool cylinder. By this structure, the spring has an unbiased orientation with the extension cord fully wrapped about the spool cylinder and a biased orientation with the extension cord fully extended exterior of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wall mounted receptacle with retractable extension cord which has all the advantages of the prior art extension cord assemblies and none of the disadvantages.

It is another object of the present invention to provide a new and improved wall mounted receptacle with retractable extension cord which may be easily and efficiently manufactured and marketed.

It is a further object of the present invention to provide a new and improved wall mounted receptacle with retractable extension cord which is of a durable and reliable construction.

An even further object of the present invention is to provide a new and improved wall mounted receptacle with retractable extension cord which is susceptible of a low cost of manufacture with regard to both materials and labor, and which accordingly is then susceptible of low prices of sale to the consuming public, thereby making such wall mounted receptacle with retractable extension cord economically available to the buying public.

Still yet another object of the present invention is to provide a new and improved wall mounted receptacle with retractable extension cord which provides in the apparatuses and methods of the prior art some of the advantages thereof, while simultaneously overcoming some of the disadvantages normally associated therewith.

Still another object of the present invention is to supply electricity to a remotely positioned portable appliance with a retractable extension cord.

Lastly, it is an object of the present invention to provide a new and improved wall mounted receptacle with retractable extension cord including a housing with a primary mounting plug unit having a pair of prongs fixed to and extending perpendicularly from the housing for inserting within a conventional electrical receptacle. Further provided is a manual spool reel assembly and an associated extension cord wrapped thereabout thus being capable of being distributed and retracted manually. Also included is a spring-biased automatic spool retraction assembly with an unbiased orientation with the extension cord fully wrapped about the spool cylinder and a biased orientation with the extension cord fully extended exterior of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
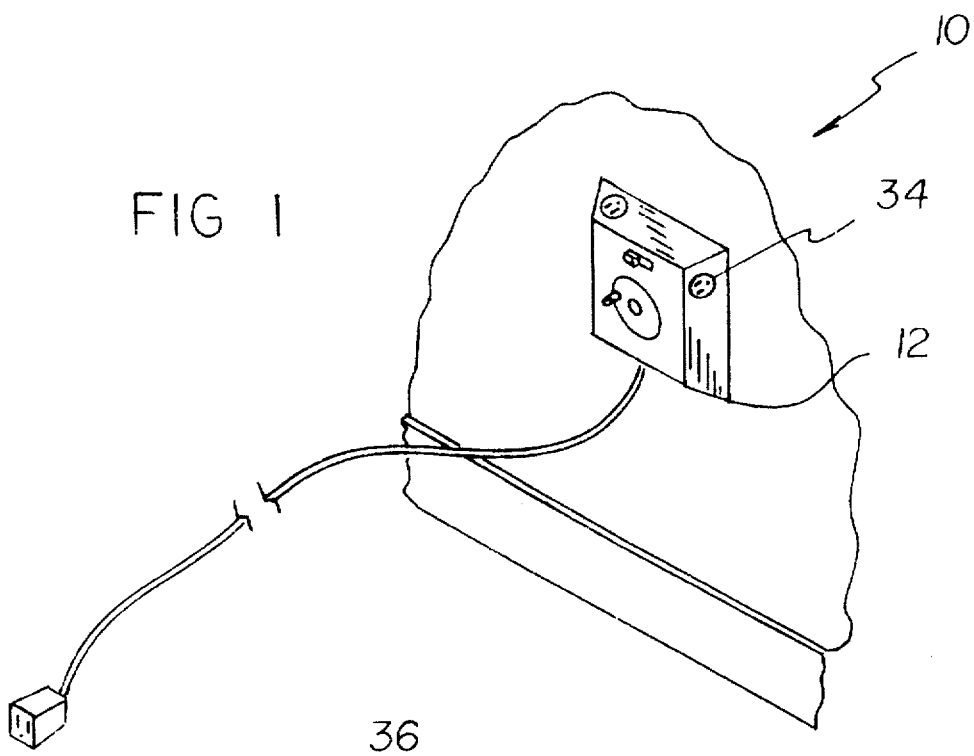
FIG. 1 is a perspective illustration of the preferred embodiment of the wall mounted receptacle with retractable extension cord constructed in accordance with the principles of the present invention.
Figure 2:
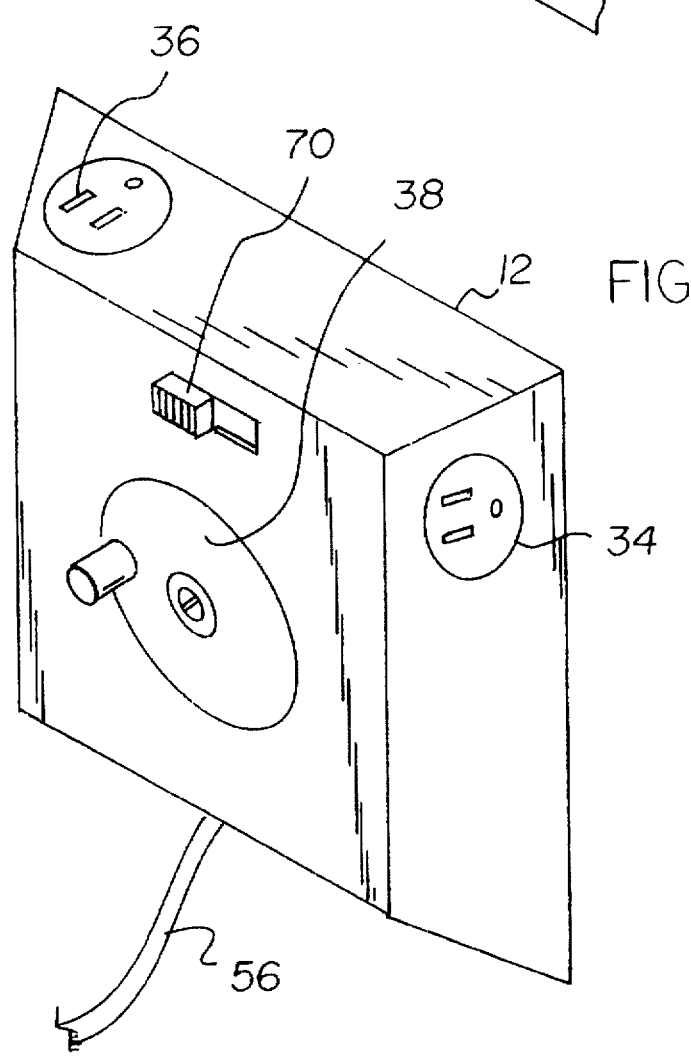
FIG. 2 is a close-up perspective view of the present invention.

With reference now to the drawings, and in particular to FIG. 1 thereof, a new and improved wall mounted receptacle with retractable extension cord embodying the principles and concepts of the present invention and generally designated by the reference numeral 10 will be described.

The present invention, the new and improved wall mounted receptacle with retractable extension cord, is comprised of a plurality of components. Such components in their broadest context include a housing, sockets, manual spool reel assembly, extension cord assembly, automatic spool reel assembly and a fuse switch. Such components are individually configured and correlated with respect to each other so as to attain the desired objective.

Figure 3:
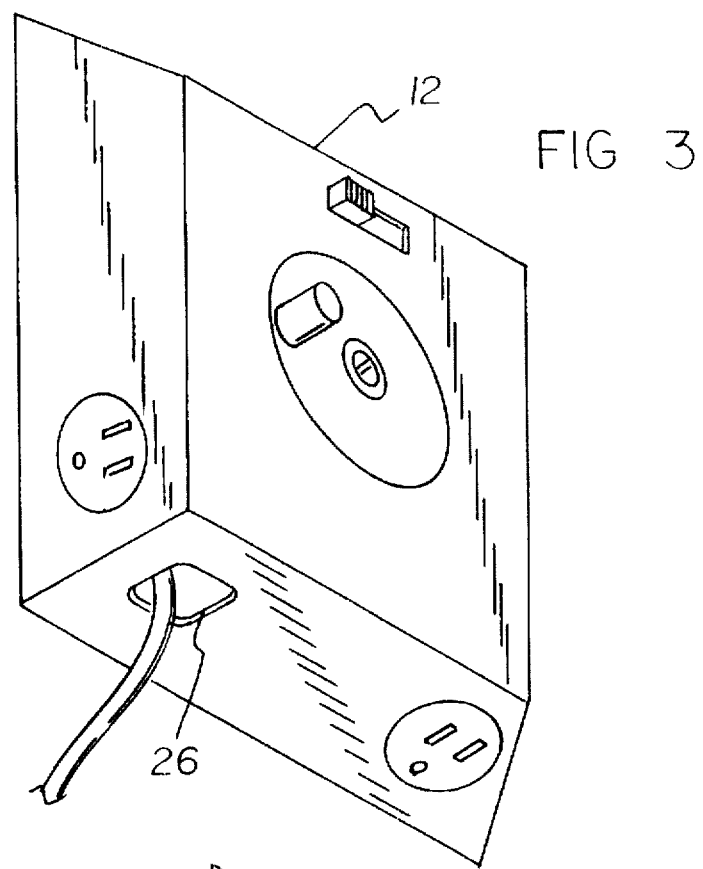
FIG. 3 is a bottom perspective view of the present invention.
Figure 5:
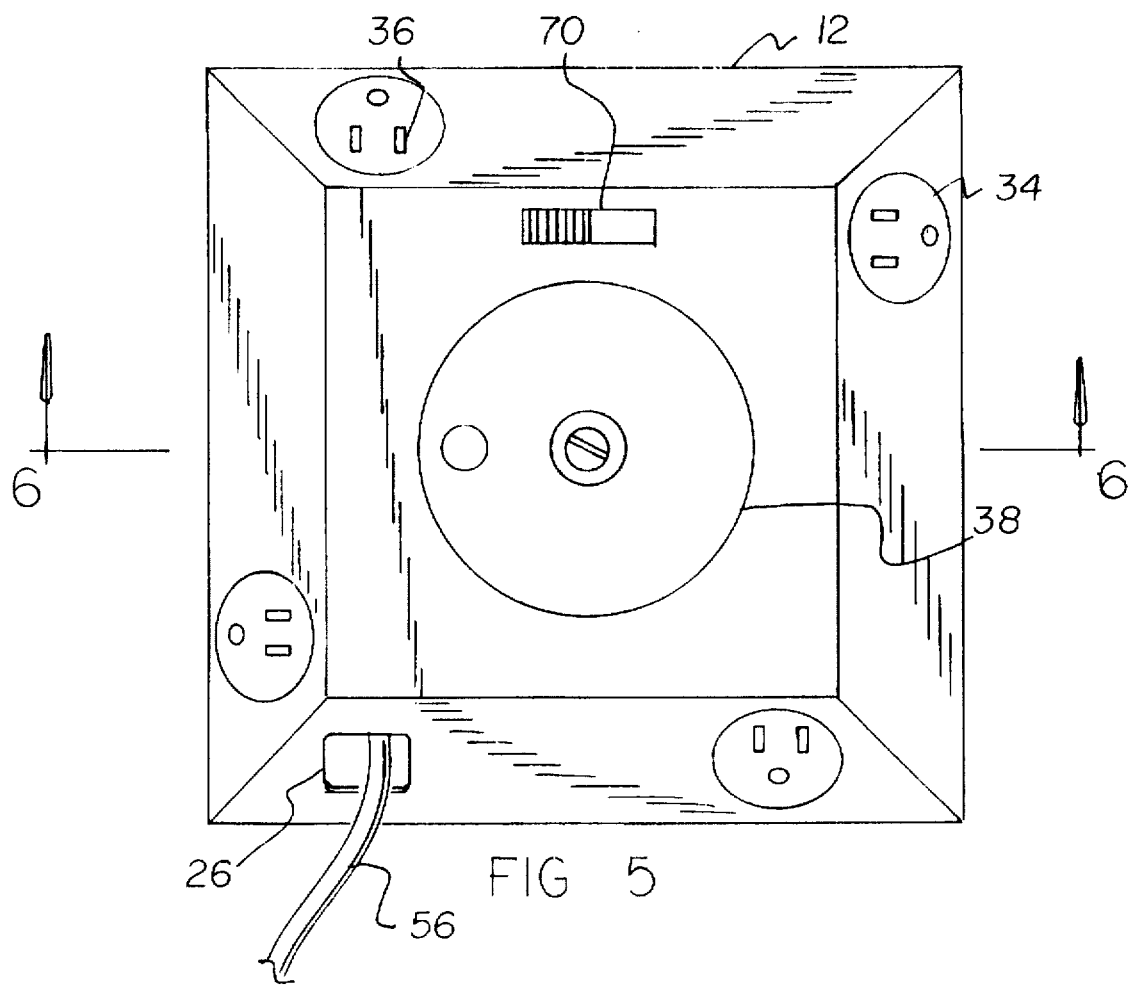
FIG. 5 is a front view of the present invention.

More specifically, it will be noted that the system 10 of the present invention includes a housing 12 having a front face with a square configuration and a first surface area and a rear face with a square configuration and a second surface area. For reasons that become apparent later, the second surface area ideally is greater than the first surface area. As best shown in FIG. 5, the housing further includes four side faces extending between side edges of the front face and side edges of the rear face, wherein the side faces define a skewed periphery which, in turn, defines an interior space. Preferably, the side edges of the rear face reside flush with a wall to which the present invention is mounted. The front face has a circular aperture 14, shown in FIG. 6, centrally formed therein and an annular recess 16 formed thereabout. A support post 20 with a generally cylindrical configuration is perpendicularly coupled to the rear face at the center thereof within the interior space. The support post extends to a point coextensive with the circular aperture of the front face. A bore 22 is axially formed within the support post. Formed about the support post on the rear face of the housing is an annular flange 24. Lastly, as shown in FIGS. 3 & 5, the periphery has a cut out 26 formed therein. Ideally, the housing has a length and width between 4–8 inches and protrudes from a wall less than ½ the length thereof.

Figure 4:
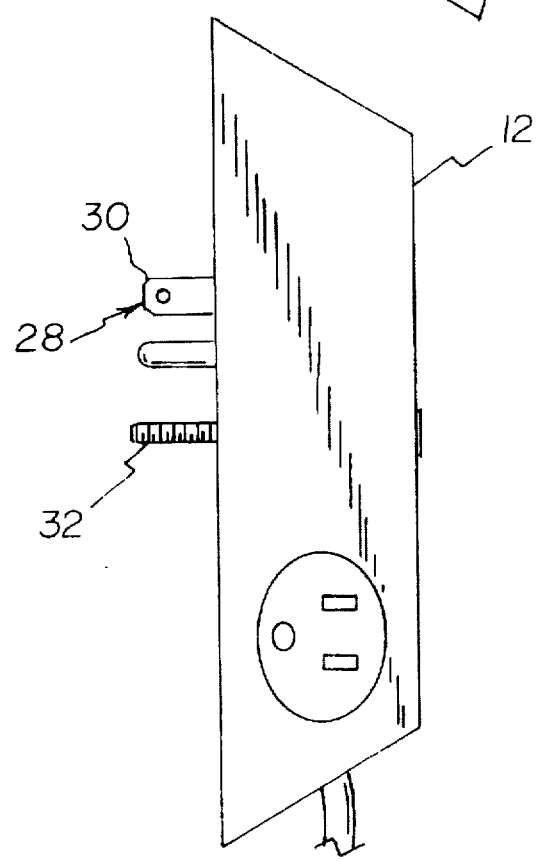
FIG. 4 is a side view of the present invention.

For mounting the housing to a conventional wall electrical receptacle, a primary mounting plug unit 28 is included. In FIG. 4, it is shown that the mounting plug unit includes a pair of prongs 30 fixed to and extending perpendicularly from an outer surface of the rear face of the housing for inserting within a conventional electrical receptacle. The primary mounting plug unit also has a screw 32 adapted to be inserted within the bore of the support post and further screwably coupled within a standard threaded aperture of the receptacle.

Further provided is a plurality of sockets 34 formed on each of the side faces of the housing for allowing the coupling with standard electrical plugs associated with an electric appliance. Each socket has a pair of conductive slots 36 each electrically connected to a respective prong of the primary mounting plug unit for receiving power therefrom.

Figure 6:
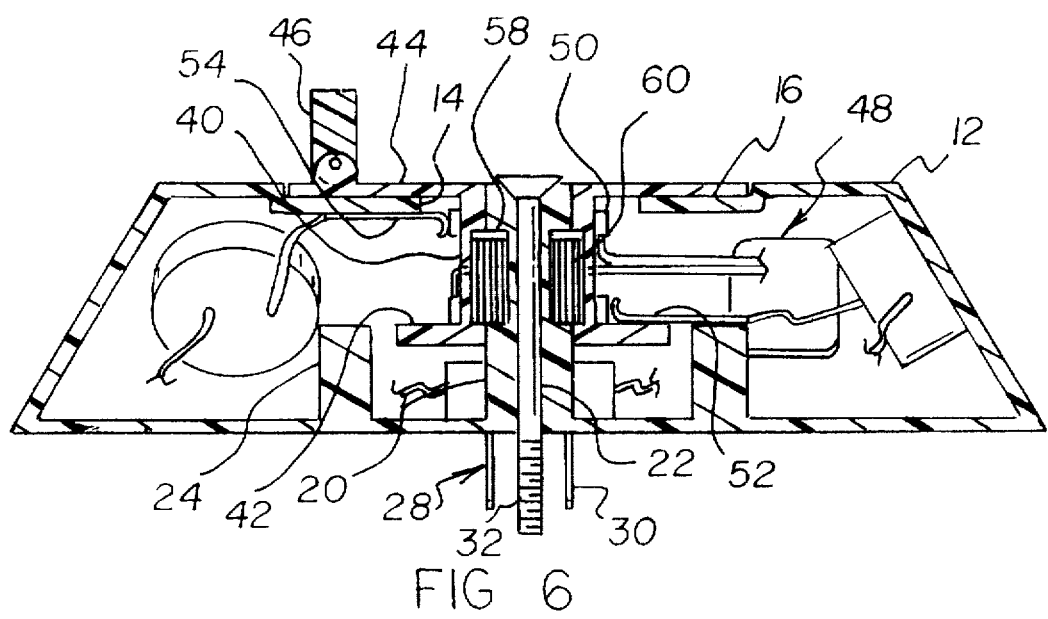
FIG. 6 is a cross-sectional view of the present invention taken along lines 6—6 shown in FIG. 5.

As best shown in FIG. 6, a manual spool reel assembly 38 is included with a hollow intermediate spool cylinder 40 rotatably coupled about the support post, wherein the spool cylinder resides coaxially with respect to the support post. A first spool retainer 42 with a first diameter is integrally formed on an inboard end of the spool cylinder with an outer periphery thereof nearly abutting an outboard end of the annular flange of the housing. Associated therewith is a second spool retainer 44 with a second diameter twice that of the first spool retainer. The second spool retainer is integrally formed on an outboard end of the spool cylinder such that the second spool retainer resides in the annular recess of the front face of the housing. The second spool retainer further includes a collapsible reel lever 46 pivotally coupled thereto with a first upright orientation for allowing manual rotation of the spool and further a collapsed orientation to avoid catching a passerby and further enhance the aesthetic nature of the present invention.

For providing electricity to an appliance which is remotely located, an extension cord assembly 48 includes a pair of annular or cylindrical as shown in the Figures, contact rings 50 coupled about the spool cylinder adjacent a respective spool retainer. For providing electrical communication with the contact rings, a pair of contact strips are included with a first contact strip 52 coupled to the outboard end of the annular flange of the housing and further in slidable abutment with the annular contact ring situated adjacent the first spool retainer. Also provided is a second contact strip 54 coupled to the front face of the housing within the interior space thereof and further in slidable abutment with the annular contact ring situated adjacent the second spool retainer. Extending through the cut out of the housing is an extension cord 56 with a first end having a standard receptacle fixed thereto for coupling with an electrical appliance and a second end with a pair of wires each coupled to separate annular contacts. It should be noted that the contact strips are electrically connected to a respective prong of the primary mounting plug unit for receiving power therefrom. The length of the cord is designed to be a function of the dimensions of the housing.

To provide automatic reeling of the cord, an automatic spool retraction assembly 58 has a coiled spring 60 situated within a space formed between the support post of the housing and the spool cylinder of the spool reel assembly. A first end of the spring is coupled to the support post and a second end is coupled to the intermediate spool cylinder. By this structure, the spring has an unbiased orientation with the extension cord fully wrapped about the spool cylinder and a biased orientation with the extension cord fully extended exterior of the housing.

For protection purposes a fuse 70 is electrically coupled between the sockets, extension cord, and primary mounting plug unit with an associated reset switch for protecting the appliances.

In use, the extension cord may be selectively ravelled and unravelled both automatically and manually and the extension cord and sockets work in conjunction to provide electricity to a plurality of appliances.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A new and improved wall mounted receptacle with retractable extension cord comprising, in combination:

a housing having a front face with a square configuration and a first surface area, a rear face with a square configuration and a second surface area greater than the first surface area, and four side faces extending between side edges of the front face and side edges of the rear face wherein the side faces define a skewed periphery which, in turn, defines an interior space, the front face having a circular aperture centrally formed therein and an annular recess formed about the aperture, the rear face including a support post with a generally cylindrical configuration perpendicularly coupled to the rear face at the center thereof within the interior space and extending to a point coextensive with the circular aperture of the front face, the support post having a bore axially formed therein, the rear face further including an annular flange formed about the support post on the rear face of the housing within the interior space thereof, wherein the periphery has a cut out formed therein;

a primary mounting plug unit including a pair of prongs fixed to and extending perpendicularly from an outer surface of the rear face of the housing for inserting within a conventional electrical receptacle, the primary mounting plug unit also having a screw adapted to be inserted within the bore of the support post and further screwably coupled within a standard threaded aperture of the receptacle;

a plurality of sockets formed on each of the side faces of the housing for allowing the coupling with standard electrical plugs associated with an electric appliance, each socket having a pair of conductive slots each electrically connected to a respective prong of the primary mounting plug unit for receiving power therefrom;

a manual spool reel assembly including a hollow intermediate spool cylinder rotatably coupled about the support post wherein the spool cylinder resides coaxially with respect to the support post, a first spool retainer with a first diameter integrally formed on an inboard end of the spool cylinder with an outer periphery thereof nearly abutting an outboard end of the annular flange of the housing, and a second spool retainer with a second diameter twice that of the first spool retainer, the second spool retainer integrally formed on an outboard end of the spool cylinder wherein the second spool retainer resides in the annular recess of the front face of the housing, the second spool retainer further including a collapsible reel lever pivotally coupled thereto with a first upright orientation for allowing manual rotation of the spool and further a collapsed orientation;

an extension cord assembly including a pair of cylindrical contact rings coupled about the spool cylinder adjacent a respective spool retainer, a pair of contact strips including a first contact strip coupled to the outboard end of the annular flange of the housing and further in slidable abutment with the cylindrical contact ring situated adjacent the first spool retainer and a second contact strip coupled to the front face of the housing within the interior space thereof and further in slidable abutment with the cylindrical contact ring situated adjacent the second spool retainer, and an extension cord extending through the cut out of the housing with a first end having a standard receptacle fixed thereto for coupling with an electrical appliance and a second end with a pair of wires each coupled to separate cylindrical contacts, whereby the contact strips are further electrically connected to a respective prong of the primary mounting plug unit for receiving power therefrom;

an automatic spool retraction assembly including a coiled spring situated within a space formed between the support post of the housing and the spool cylinder of the spool reel assembly with a first end coupled to the support post and a second end coupled to the intermediate spool cylinder, wherein the spring has an unbiased orientation with the extension cord fully wrapped about the spool cylinder and a biased orientation with the extension cord fully extended exterior of the housing; and whereby the extension cord may be selectively ravelled and unravelled both automatically and manually and the extension cord and sockets work in conjunction to provide electricity to a plurality of appliances.

\* \* \* \* \*